INVENTORS
VERNEUR E. PRATT
GEORGE F. GRAY

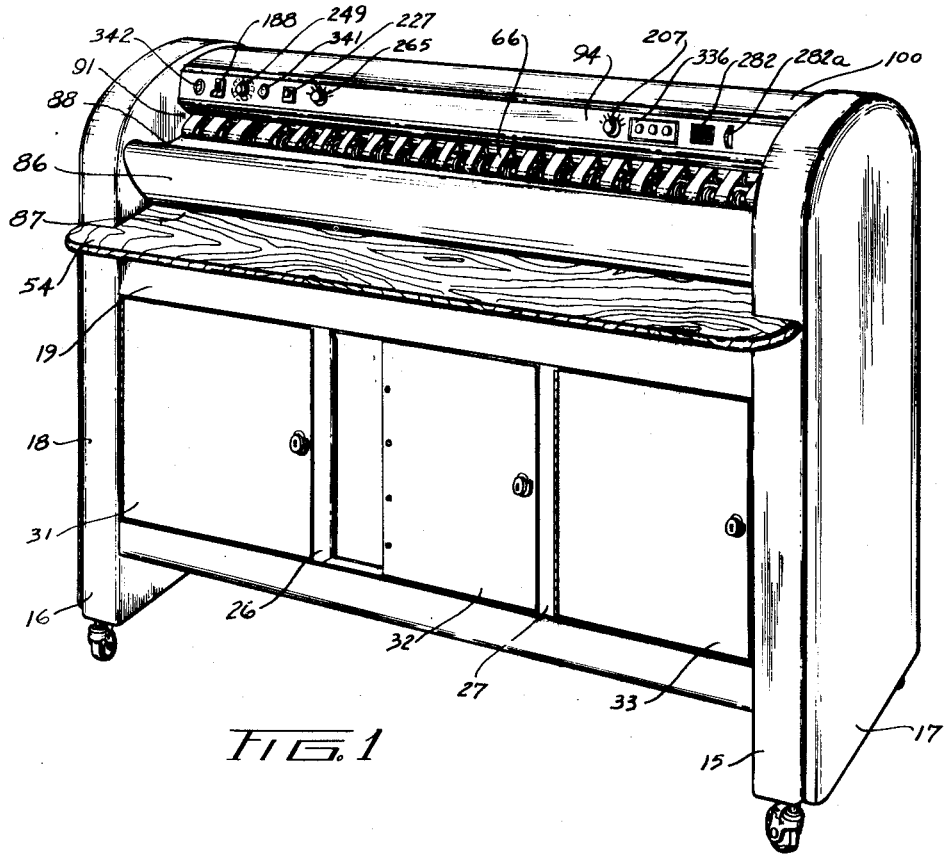
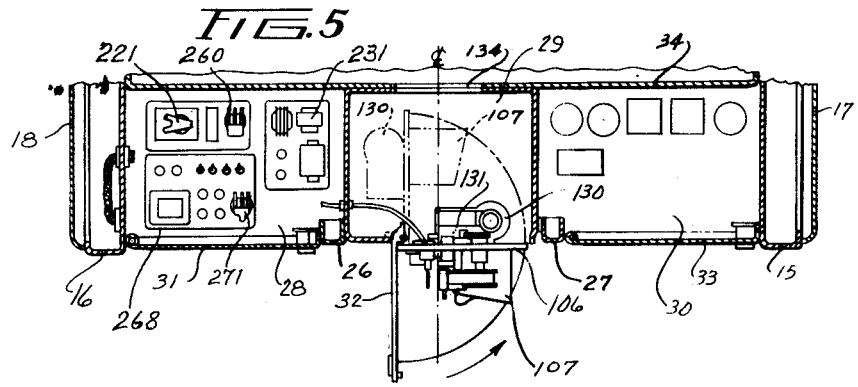

Aug. 12, 1952 V. E. PRATT ET AL 2,606,478
MICROFILM APPARATUS
Filed Dec. 1, 1948 7 Sheets-Sheet 3

*INVENTORS*
VERNEUR E. PRATT
GEORGE F. GRAY
BY
*Van Deventer & Shively*
ATTORNEYS

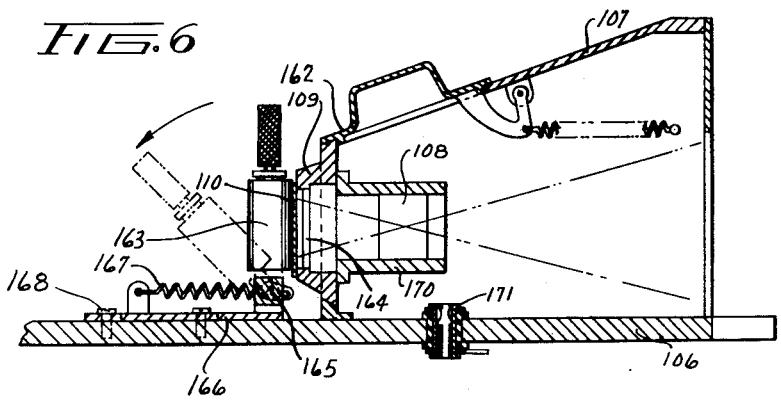
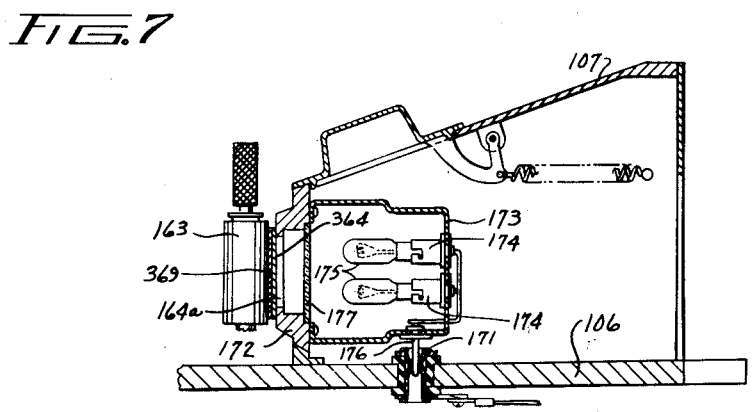
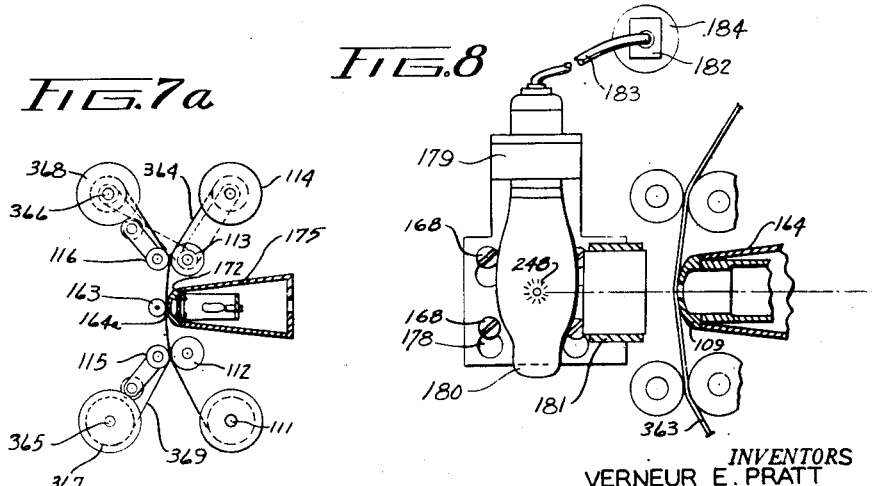

Aug. 12, 1952 V. E. PRATT ET AL 2,606,478
MICROFILM APPARATUS
Filed Dec. 1, 1948 7 Sheets-Sheet 6

INVENTORS
VERNEUR E. PRATT
GEORGE F. GRAY
BY
ATTORNEYS

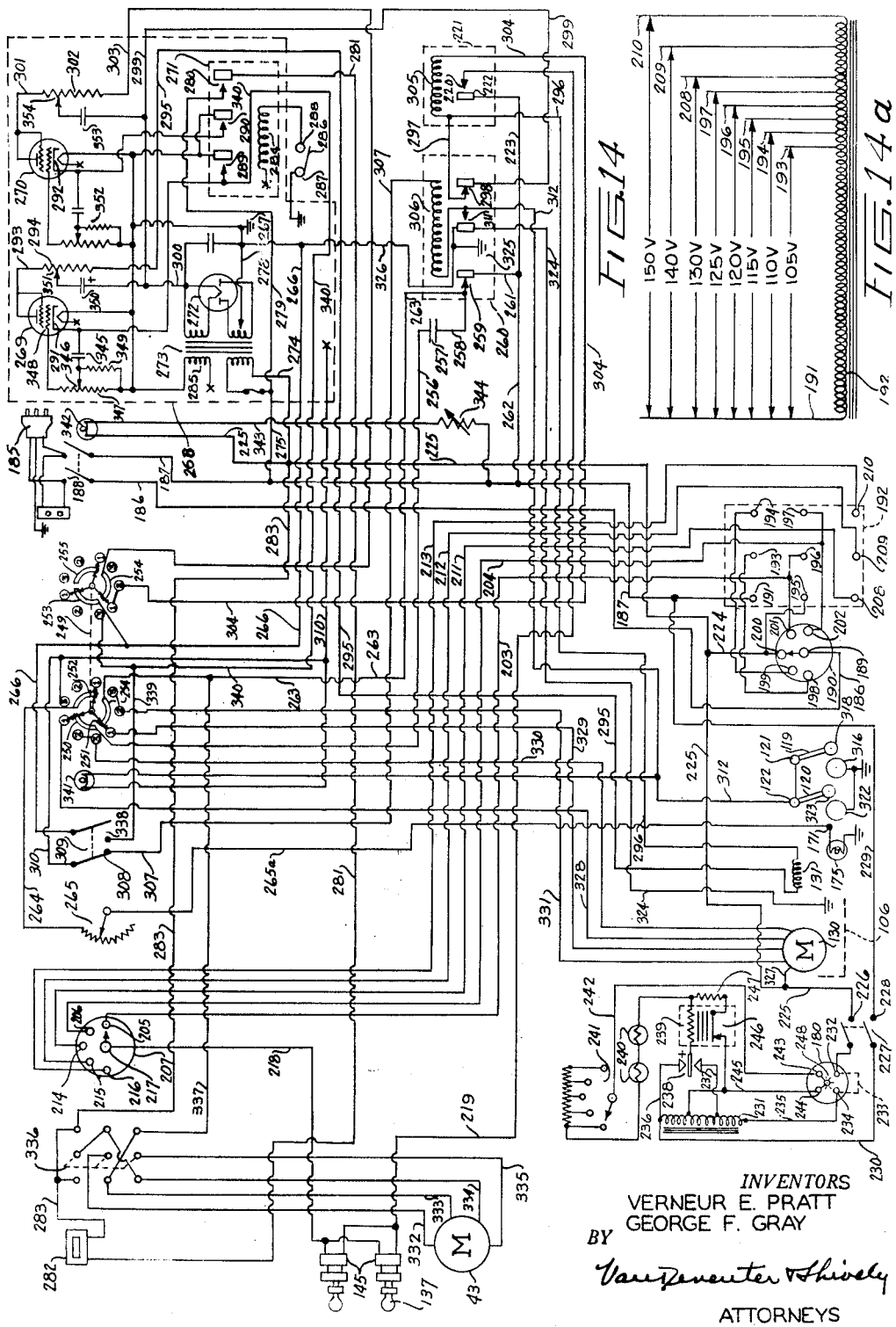

Patented Aug. 12, 1952

2,606,478

UNITED STATES PATENT OFFICE 2,606,478

MICROFILM APPARATUS

Verneur E. Pratt and George F. Gray,
Norwalk, Conn.

Application December 1, 1948, Serial No. 62,942

15 Claims. (Cl. 88—24)

The present invention pertains to improvements in micro-film apparatus.

In our co-pending application, Serial No. 622,193, filed October 13, 1945, now Patent No. 2,509,072, of which the present application is a continuation in part, is described and claimed a flow-film camera of sectional construction, generally corresponding in structure, height and depth to the proportions of a filing cabinet, the device being adapted to receive copy of any size, up to wide prints or tracings. The copy is fed upside down into the top section wherein it is conveyed across the optical path of a camera head located in the underlying record section. The copy then passes downward through a suitable chute, and is finally delivered right side up through the front of the lower section.

An object of the present invention is to provide a flow camera adapted to receive wide or narrow copy through a feed throat at ordinary desk level and after photographing the copy in motion to deliver it from the upper front of the structure at convenient eye level for an operator seated before the machine.

Another object is to provide a device of the above nature including means to shift delivery from the front to the rear of the structure.

A further object is to provide a device of the above type which, while adapted to receive wide copy of any length, is of minimum size, light and rigid in structure and readily movable into or out of restricted spaces.

A further object is to provide improved means forming an optical path whereby maximum compactness of the structure is attained while maintaining ample optical length for sharp and accurate definition throughout the entire area of the largest copy.

Another object is to provide a device of the above nature including a camera head hinged within the front wall and adapted to be swung bodily outward for readily changing films, lenses, etc.

Another object is to provide improved means for conveying and guiding the copy.

Another object is to provide simple and effective means for side-marking the film with identifying data.

A further object is the provision of improved film controlling means.

Another object is to provide improved structure and arrangement for illuminating the copy for readily replacing lamps.

A still further object is to provide a device of the above nature including means to produce enlarged reproductions by flow projection, and to produce contact film positives.

Another object is to provide a device of the above type including a pair of side frames to and between which all major structures of the assembly are removably secured, thus permitting compact "knock-down" shipment if desired, easy re-assembly, and improved accessibility.

Other objects and advantages of the invention will become evident during the course of the following description in connection with the accompanying drawings, in which:

Fig. 1 is a perspective exterior view of a preferred form of the invention;

Fig. 5 is a diagrammatic plan illustrating the three front compartments and the swing-out arrangement of the camera head;

Fig. 6 is a detail longitudinal section of the lens mounting and related parts;

Fig. 7 is a detail view of the light source for contact printing;

Fig. 7a is a diagram illustrating the relationship of the parts in contact printing;

Fig. 8 is a detail view of the auxiliary light source structure for projection printing;

Fig. 9a shows a length of typical film illustrating the stop notches;

Fig. 12 shows means for photographically side-marking the film with an identifying legend or the like;

Fig. 14 is a schematic wiring diagram illustrating the electrical connections.

Fig. 14a is a diagrammatic illustration of the internal connections of the auto-transformer.

Referring to Fig. 1, the numerals 15 and 16 designate a pair of hollow side frames, preferably of welded sheet metal construction, provided with hinged doors 17 and 18.

Figure 2:
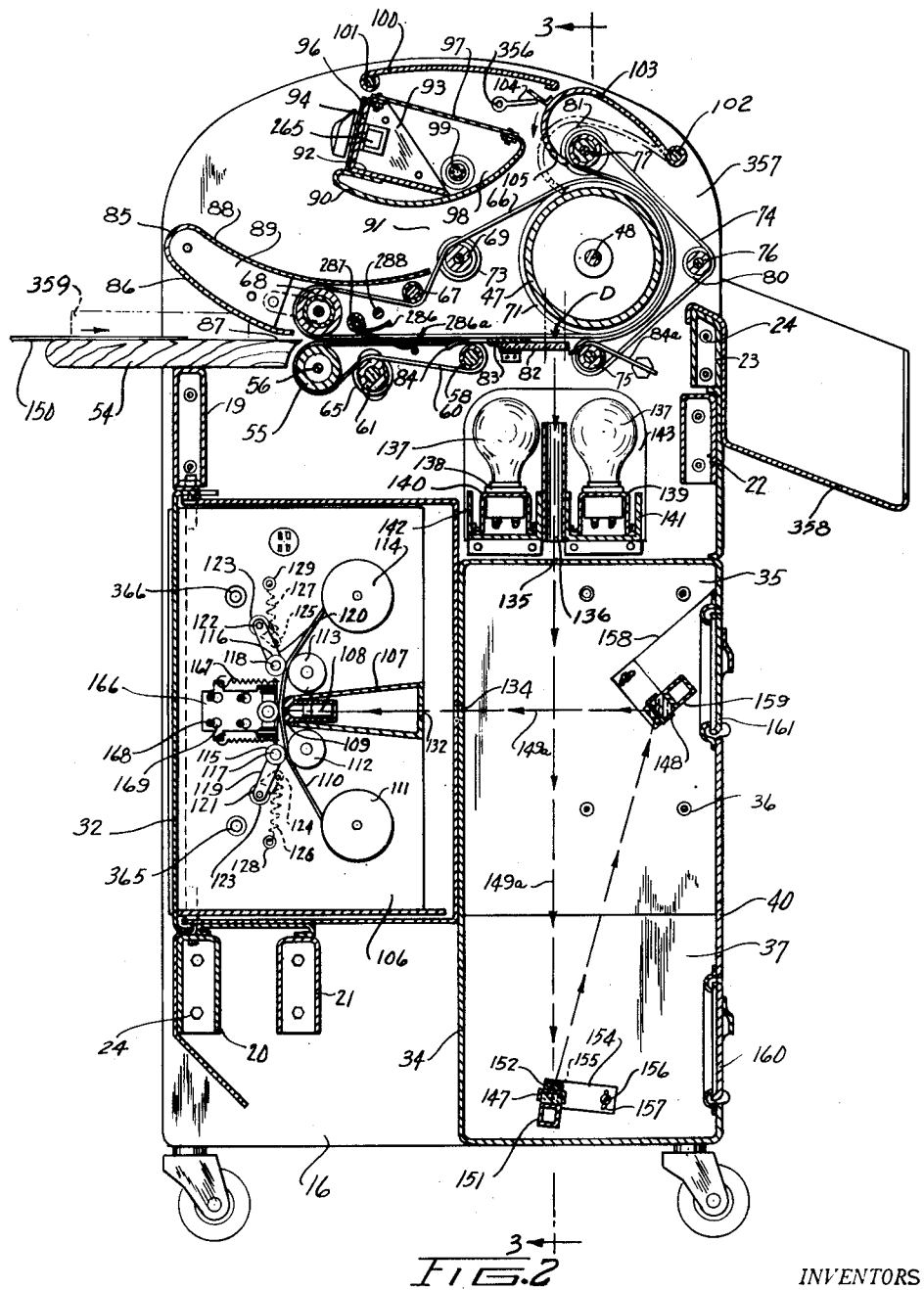
Fig. 2 is a vertical central cross section of the same.

Transverse structural members 19, 20, 21, 22 and 23, Fig. 2, preferably of inverted U-section and with closed ends, are detachably secured to the frames 15 and 16 by means of bolts 24. Vertical members 26 and 27, Figs. 1 and 5, divide the front of the machine into three compartments 28, 29 and 30, provided with hinged doors 31, 32 and 33, respectively.

Figure 3:
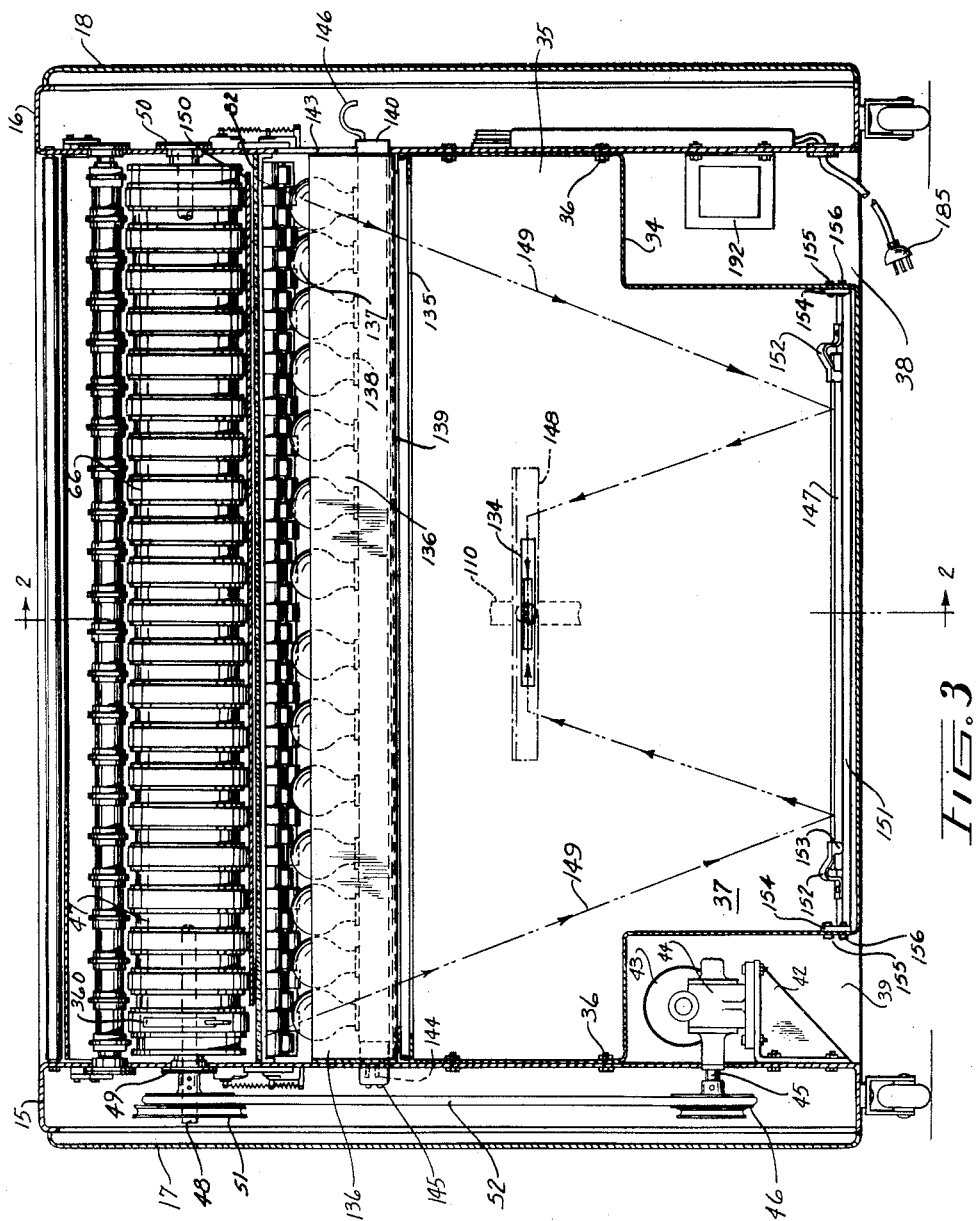
Fig. 3 is a transverse section approximately in the plane 3—3, Figure 2.

A mirror casing or box 34, Figs. 2 and 3, has a wide upper portion 35, extending the full distance between the end frames 15 and 16, and detachably secured thereto by bolts 36. The lower portion 37 of the box 34 is narrower than the upper portion as shown in Fig. 3, the stepped shape providing lower side compartments 38 and 39. The box 34 is of rigid construction, and being bolted to the end frames 15 and 16 as noted, provides in itself a rigid connecting structure between the frames, the rear wall 40 of the box 34 forming the exterior rear panel of the machine. Detachable rear closures (not shown) may be provided for the compartments 38 and 39. A bracket 42, bolted to the end frame 15 inside the compartment 39, carries a reversible synchronous motor 43 equipped with a worm-gear speed reducing mechanism 44. The output shaft 45 of the gear motor 43 extends into the interior of the end frame 15 and carries a two-stop grooved pulley 46.

A large guide drum 47, of a length substantially spanning the distance between the end frames 15 and 16, is mounted on a shaft 48 carried in flanged anti-friction bearing members 49 and 50, secured to the frames 15 and 16 respectively. A second two-step grooved pulley 51 is mounted on the end of the shaft 48 inside the hollow frame 15. A belt 52 connects the second or driven pulley 51 with the drive pulley 46, the belt being adapted to engage either corresponding pair of grooves in the two pulleys to provide two drive ratios. A spring-pressed idler 53, Fig. 4, serves to maintain proper belt tension in any of the drive positions.

A feeding table 54, Figs. 1 and 2, is secured in the front of the machine and extends outwardly therefrom, at approximately ordinary desk height.

Figure 4:
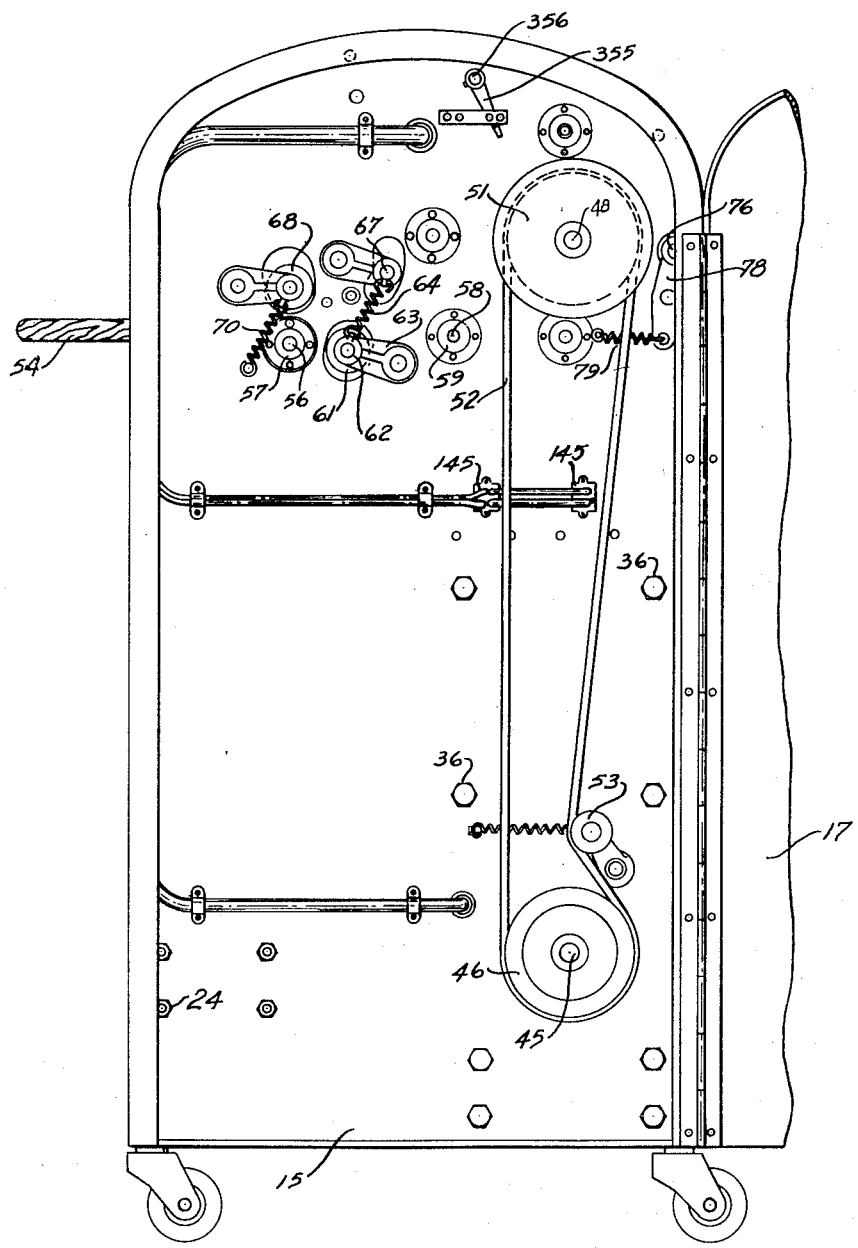
Fig. 4 is a side view with the door removed to show the drive and related mechanism.

Directly behind the inner edge of the table 54 is a transverse roller 55 having the ends of its shaft 56 journalled in bearing members 57 secured to the frames 15 and 16 as illustrated in Fig. 4. A second transverse roller 58, also rotatively supported in fixed bearing members 59 secured to the end frames, is disposed parallel to the roller 55 at a point below the front side of the drum 47. The upper sides of the peripheries of rollers 55 and 58 are in horizontal alignment at substantially the top level of the table 54.

A plurality of endless flat belts or tapes 60 is disposed on the rollers 55 and 58. A third or tension roller 61 is equipped with end bearings 62 carried in short lever members or arms 63 pivotally mounted in the end frames 15 and 16, as shown in Fig. 4. Springs 64 urge the arms 63 upward, pressing the roller 61 against the belts 60 to hold the latter in proper tension. Spaced flanges 65 on the roller 61 serve to keep the belts 60 in spaced relation throughout the lengths of the three rollers described.

A second set of belts 66 is carried on the drum 47, these belts also engaging three parallel rollers 67, 68 and 69. The roller 67 is swing mounted in the same manner as tension roller 61, and is pressed downward by the springs 64 to tension the belts 66. The front roller 68, disposed directly above the roller 55 is also swing mounted and is urged downward by springs 70, as illustrated in Fig. 4, so as to normally press the belts 66 against the lower belts 60 on the roller 55.

The roller 69 is a fixed center discharge roller having rubber flanges 73 extending between the belts 66 for a purpose which will be described hereafter.

A third set of tapes or belts 74 is carried on three rollers 75, 76 and 77, Fig. 2, these rollers being so arranged that their belts normally engage the second set of belts 66 below the drum 47 and throughout the rear peripheral extent of the latter. The middle roller 76 is swing mounted on levers 78 as shown in Fig. 4, and is urged rearwardly by springs 79 to maintain the belts 74 normally in firm engagement with their respective mating belts 66. Roller 76 is equipped with belt-spacing flanges 80, while roller 77 carries rubber discharge flanges 81.

It will be noted in Fig. 2 that the upper side of the roller 75 is so located as to hold the belts 66 normally in horizontal parallel engagement with the corresponding belts 60 throughout the latter's span from the front roller 55 to the rear roller 58.

A transparent guide plate 82 is disposed slightly below the tapes or belts 66 just forward of the roller 75, being secured to a metallic shoe 83 having forwardly directed fingers 84 extending over the grooved roller 58 and downward between the belts 60. A second set of guide fingers 84a extend over the roller 75 and below the rear edge of the plate 82. The plate 82 prevents either the leading or trailing edges of limber copy from sagging out of proper focus.

A member 85, preferably of sheet metal, is formed with a downwardly convex lower guide portion 86 cooperative with the table 54 to form the feed throat 87. The upper portion 88 of member 85 forms an upwardly concave receiver for delivered copy. The member 85 is mounted on flat end supports 89 on the inner sides of the frames 15 and 16, being readily removable therefrom to permit access to the interior belt assembly and related parts. An upper guide member 90, also preferably of sheet metal, is downwardly convex and cooperates with the upper portion 88 of member 85 to form a forwardly directed delivery or discharge throat 91.

The upper guide member 90 is secured to a transverse angle member 92 having end plates 93 removably secured to the frames 15 and 16. The front face of the angle member comprises a panel 94 carrying various controls 265 and the like. The controls are provided with a suitable elongated escutcheon 96 as shown in Fig. 1. A plate 97, which may be perforated for ventilation, is secured on the top of the panel 94 and the upper guide member 90, forming a closure for the elongated space 98 containing the bodies of the controls 265, etc., and their wiring cables 99.

A top closure panel 100, curved to conform with the upper curvature of the frames 15 and 16, is secured to a transverse hinge rod 101 and normally overlies the plate 97 as shown in Fig. 2. The top closure 100 may be swung forward to uncover the plate 97 should access be desired to the controls 265, etc., or their wiring 99.

A second transverse hinge rod 102 carries the rear edge of a scroll-shaped deflector or "doctor" 103, overlying the upper guide roller 77 and curving downward around the front of the latter. Small levers 104 normally hold the deflector in upper position as shown in Fig. 2, in which position short fingers 105 on the edge of the deflector extend between the rubber ejector flanges 82 of the roller 77. When it is desired to cause rear delivery of copy as hereinafter set forth, the deflector 103 may be shifted down to the position shown in dot-and-dash lines in Fig. 2, by lowering the levers 104. In the lower position the fingers 105 extend between the belts 66 into grooves 71 on the drum 47.

A camera head plate 106, Figs. 2 and 5, is secured to the inner side of the door 32 so as normally to be enclosed in the middle compartment 29. A light tunnel 107 secured to the plate 106, has detachably disposed therein a lens 108, preferably contained in a combined lens mount and film guide 109. To avoid undue complication in the small scale of Fig. 2, the lens mounting and related parts shown therein are in semi-diagrammatic form, further details of the actual preferred structure being shown in enlarged Fig. 6 and described hereafter.

A film 110, initially placed on a supply reel 111, is adapted to move via a tension roller 112, the guide 109, and a drive roller 113 to a take-up reel 114. Pressure rollers 115 and 116 are mounted on shafts 117 and 118 secured in the ends of swinging arms 119 and 120, which latter are secured to spindles 121 and 122 journalled in insulated bushings 123 in the plate 106. Short levers 124 and 125, secured to the spindles 121 and 122 behind the plate 106, are connected via toggle springs 126 and 127 with pins 128 and 129, the latter pins being insulated from the plate.

A synchronous gear motor 130, Fig. 5, is adapted to operate the drive roller 113 via a magnetic clutch 131.

The light tunnel 107 normally communicates optically via a transverse slot 132 with a second transverse slot 134 in the front of the mirror box 34.

A slot 135 is provided in the top of the mirror box 34 below the transparent plate 82. A narrow conduit or light-shielded passage member 136 extends upward above the slot 135 and toward the plate 82. Two rows of incandescent lamps 137 are disposed in sockets 138 secured in inverted channel members 139 and 140. The latter members are slidable in guides 141 and 142 removably secured to the frames 15 and 16.

Referring to Figs. 2 and 3, it will be noted that the frame member 16 has therein an opening 143, through which the light fixture members or racks 139 and 140 may be slid inward or outward when the end door 18 is open. All sockets 138 of each rack, for example, 139, are wired in parallel to a pair of prong electrodes 144 normally engaging an outlet 145 secured to the frame 15. Thus when it is desired to inspect or replace any lamps of rack 139, it is only necessary to open the end door 18, grasp a handle 146 provided on the rack 139 and slide the latter bodily out through the opening 143. The prongs 144 disengage the outlet 145, so that no flexible leads or the like are required, and the lamp circuits are automatically broken upon removal and restored upon replacement of the racks.

A narrow mirror 147 is disposed in the bottom of the box 34 directly below the top slot 135, and is inclined slightly toward the rear as shown in Fig. 2. A second narrow mirror 148 is mounted in the rear of the box 34 in horizontal line with the slot 134, and is inclined downwardly. The inclination of the mirrors is such that when the lamps 137 illuminate the plane of the belt 66 above the plate 82, light from a narrow transverse strip of that plane passes downward through the shield 136 and slot 135 to the mirror 147, thence upward and rearward to the second mirror 148, thence directly forward through the slot 134 and tunnel 107 to the lens 108 and film 110.

It will be seen from examination of Figs. 2 and 3 that by the arrangement and proportion of the parts determining the optical path 149, the film 110 is enabled to receive an image of a narrow area extending across the entire width of a sheet of copy 150 disposed below the drum 47. The structures shown provide ample optical distance in extremely compact space, at the same time minimizing the number of mirrors and avoiding the use of very wide lens angles with the latter's attendant difficulties from aberration and expensive construction.

Figure 13:
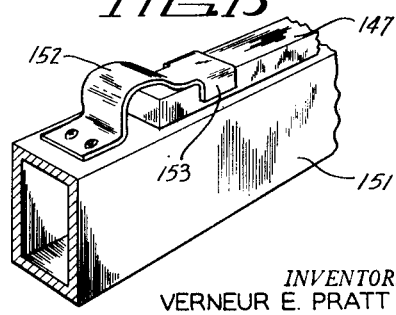
Fig. 13 is an enlarged detail view of mirror end structure and mounting means.

In an optical path as described, it is of utmost importance that the mirror structure be rigid and free from vibration. These results are accomplished as follows, referring first to Fig. 3: The mirror 147 is supported on a rigid hollow metal bar 151 secured to the side walls of the box 34. Spring clips 152 are secured to the bar 151 and engage the mirror 147 near its ends, as illustrated in enlarged Fig. 13, holding the mirror firmly in place on the bar. Side lugs 153 on the clips 152 hold the mirror from shifting sidewise.

The mirror 147 is of the front silvered type, and it will be noted that it is made from glass of very heavy thickness. This heavy construction serves a double purpose. First, it provides a mirror of great inherent rigidity and freedom from distortion, particularly as the spring clip mounting permits natural expansion or contraction of the mirror during temperature changes without significant end stresses. Secondly, the large mass and consequent inertia of the clip-mounted mirror render it insensitive to any vibrations likely to be encountered during operation of a machine of the character embodied herein.

Short laterally extending plates 154, Figs. 2 and 3, are attached to the ends of the bar 151, and are secured to the sides of the box 34 by screws 155 and 156. The holes in the plates accommodating screws 156 are slotted as illustrated at 157, Fig. 2, thus permitting accurate adjustment of the inclination of mirror 147. After proper adjustment has been made, the screws 155 and 156 are tightened, the rigid structure thereafter ensuring permanently proper alignment.

The mounting of mirror 148 is similar to that described, except that due to the comparative shortness of mirror 148, end brackets 158 may be secured in the back of box 34, to permit use of a shorter mounting bar 159.

Hinged light-tight doors 160 and 161 are provided to give access to mirrors 147 and 148 for occasional dusting or the like.

Detail Fig. 6, as previously noted, is a fragmental horizontal section, and shows the arrangement and relationship between the light tunnel 107 and related parts.

The film guide member 109 is clamped in the suitably shouldered end of the tunnel 107 by means of a hinged and spring-pressed lid 162 which forms a closure for the top of the tunnel. The film 110 is drawn into engagement with the guide 109 by the light tension provided by roller 112, Fig. 2, but to further ensure accurate spacing a guide roller 163 is provided to press lightly against the film directly in line with the slit 164 in the guide.

The roller 163 is mounted on a trunnion 165 which is cross-pivoted to a bracket 166. Toggle-springs 167, Figs. 2 and 6, normally press the roller against the film 110 as noted above. When it is desired to change the film, change lenses, etc., the roller 163 may be swung outward as shown in dot and dash lines, Fig. 6. In this operation the toggle springs 167 ride over center in the usual manner, thus retaining the roller in retracted position.

The bracket 166 is removably secured to the main plate 106 by means of filister-head screws 168 which engages key-hole slots 169 in the bracket, as shown in Fig. 2.

The lens unit 108 is secured in a cylindrical retainer 170, firmly secured to the guide 109, carefully gaged initial spacing of the lens from the film guiding surface ensuring permanently accurate focus, due to the right unitary structure of the guide and lens mounting combination.

A single jack 171 is insulatedly mounted in the panel 106. When it is desired to use the machine for direct contact printing, as hereinafter set forth, the guide 109 carrying the lens mount 170 and lens 108 is removed and replaced by an alternative guide 172, Fig. 7. A frame 173, secured to the inner side of guide 172, carries a pair of sockets 174 provided with small lamps 175. A prong electrode 176, wired to the lamps 175, engages the jack 171. A small ground glass screen 177 is secured in the guide 172 behind the slit 164a, in order to diffuse the light from the lamps 175.

Fig. 8 illustrates the arrangement by which the machine is adapted to enlarging or projection printing. For this purpose the bracket 166 is removed, together with the roller 163, and replaced by a second bracket 178 on which is mounted a socket 179 carrying a high-intensity light source such as a zirconium crater arc lamp 180. The bracket 178 also carries a suitable condensing lens 181 interposed between the lamp 180 and the film guide 109. A four-pronged plug 182, connected to the socket by a cable 183, is adapted to engage an outlet 184 set in the panel 106.

Referring to the schematic wiring diagram, Fig. 14, the numeral 185 designates an attachment plug for making connection to a suitable source of alternating current. From the plug 185 current is led to two main power conductors 186 and 187 via a double-pole switch 188, the latter being mounted on the instrument panel 94 as shown in Fig. 1.

The power conductor 186 is connected directly to the movable electrode 189 of a five-point selector switch 190, while the second power conductor is connected to one input terminal 191 of an auto-transformer 192. Five taps 193, 194, 195, 196 and 197 of the auto-transformer 192 are connected respectively to stationary contacts 198, 199, 200, 201 and 202 of the switch 190. Taps 196 and 197 are also connected via leads 203 and 204 respectively, with two points 205 and 206 of a second five-point switch 207 located on the instrument panel 94. Three additional output terminals 208, 209 and 210 of the auto-transformer 192 are connected by leads 211, 212 and 213, respectively, to the remaining three stationary points 214, 215 and 216 of the switch 207.

The common or movable electrode 217 of the switch 207 is connected via a wire 218 to the two outlets 145, Figs. 2 and 3, serving the banks of lamps 137. The second lead 219 from the outlets 145 is connected to one contact point 220 of a normally open relay 221. The second contact point 222 of relay 221 is connected via a conductor 223 with the second power conductor 187.

From the above description it will be evident that closure of the relay 221 directs current from the power conductor 186 via the selector switch 190, the auto-transformer 192, and the second selector or light control switch 207 to the lamps 137, thence via the relay 221 to the second power conductor 187, thus energizing the lamps.

The auto-transformer 192 performs a double function, namely that of furnishing a variable voltage current supply for the lamps 137, while at the same time, in combination with the selector switch 190, providing means to maintain properly uniform operating voltages throughout the apparatus under varying conditions of supply voltage. The manner in which this is accomplished is best explained in connection with Fig. 14a, which illustrates diagrammatically the internal connections of the auto-transformer.

Referring to Fig. 14a, it will be noted that assuming a potential difference of 115 volts between the input terminal 191 and the tap 195, the potential differences between input 191 and taps 193, 194, 196, 197, 208, 209 and 210 are respectively 105, 110, 120, 125, 130, 140, and 150 volts. Under these conditions, by turning the second selector switch 207 to various appropriate contact positions, the lamps 137 may be furnished selectively with current at 120, 125, 130, 140 or 150 volts, thus selectively varying the intensity of illumination.

With normal main supply voltage of about 115 volts, the above described conditions are accomplished by placing the movable electrode 189 of the selector switch 190 in contact with the stationary point 200 which, as previously noted, is connected to the transformer tap 195. The input to the transformer thus takes place through terminal 191 and tap 195, and the voltages throughout are as shown in Fig. 14a. However, in the case of low supply voltage in the neighborhood of 105 volts, the movable switch electrode 189 is placed in engagement with the stationary point 198 connected to the transformer tap 195. The 105 volt supply is thus directed into the 105 volt portion of the transformer winding, and all potentials remain the same as shown in Fig. 14a.

In the same manner, supply voltages of approximately 110 volts, 120 volts or 125 volts may be directed by means of the switch 190 into the corresponding winding portions of the auto-transformer 192. By this means the operating voltages may be maintained at substantially constant proper magnitudes for uniform operation of the machine under differing conditions of available supply voltage. This feature is of great importance in photographic processes involving light intensities and other factors such as the electronic control system to be described hereinafter.

While the above description has been made in terms of specific voltages referred to 115 volts as a commonly available supply voltage, it will be understood that the specific voltages are given only as a preferred embodiment, as obviously the device may be constructed for any other desired standard of supply voltage and relationship of internal operating voltages.

A short wire 224 connects the contact point 200 of switch 190 and the tap 195 of auto-transformer 192 with a conductor 225, hereinafter referred to for convenience as the 115 volt conductor.

One end of the 115 volt conductor 225 is connected to one outer pole 226 of a double-pole switch 227, the second pole 228 being connected via a wire 229 with the second main power conductor 182. One inner pole of the switch 227 is connected via a wire 230 with one terminal of a second auto-transformer 231. The second inner pole of switch 227 is connected to one terminal 232 of the crater arc lamp 180, the lamp being assumed as plugged in and the intermediate sockets and connectors being omitted from the schematic diagram for simplicity. When the lamp 180 is plugged in, an internal jumper 233 in the lamp electrically connects the terminal 232 with a second lamp terminal 234, which latter terminal has a connection 235 to the second terminal of the auto-transformer 231. A terminal branch lead 236 and a tap 237 connect the auto-transformer 231 with a full-wave rectifier 238. The direct current output operating connection from the rectifier 238 passes through a choke 239 and a pair of ballast tubes 240 to a rheostat 241, thence via a conductor 242 to the third terminal 243 of the lamp 180. The connection of the fourth lamp terminal 244 comprises a conductor 245 tapped into the transformer 231 midway between the terminal lead 236 and the tap 237.

A normally closed switch 246, preferably of the mercury type, and a resistor 247 are connected in series between the conductor 245 and the outer terminal of the choke 239, the switch 246 being magnetically operable by the core of the choke. When the switch 227 is closed to energize the auto-transformer 234, current from the rectifier 238 initially passes through the choke 239, the resistor 247 and switch 246. Energization of the choke 239 suddenly opens the switch 246, diverting a heavy surge through the ballast tubes 240, rheostat 241 and conductor 242, to the lamp terminal 243, thus striking the arc 248.

The numeral 249 generally denotes a two decked six-pole triple position rotary switch located on the control panel 94. One deck comprises three bus segments 250, 251 and 252, the second deck having corresponding bus segments 253, 254 and 255.

The bus segment 250 is connected via a wire 256, a capacitor 257 and a lead 258 with one side of a normally closed contactor 259 comprising part of a relay 260. The other side of contactor 259 is connected via a lead 261 and a conductor 262 with the second main power conductor 127. The bus segment 251 is connected via a conductor 263 with the first-named side of the contactor 259. The segment 252 has a connection via a wire 264, a rheostat 265 and a second wire 265a with the jack 171, Figs. 6 and 7, thence to the lamps 175 when the latter are plugged in as shown in Fig. 7.

The second deck bus segment 253 is connected via a lead 266 to ground 267 on a chassis 268, hereafter referred to as the electronic control chassis, located in the compartment 29, Fig. 5. The chassis 268 supports two beam power tubes 269 and 270, a three pole normally open trip relay 271, and a full-wave rectifier tube 272 connected in the usual way with a transformer 273, the latter being supplied with primary current via leads 274 and 275 from the 115 volt conductor 225 and the second main power conductor 187 respectively.

The relay 271 is adapted, when energized, to connect the cathodes 291 and 292 of the tubes 269 and 270 to ground 267 on the chassis 268, and thence to one D. C. output conductor 278 of the rectifier tube 272. Closure of the relay 271 also establishes a connection from the power conductor 187 via lead 275a, branch 279, the relay contactor 280 and a wire 281 to a magnetic counter 282 disposed on the panelboard 94. A return wire 283 connects the counter 282 with the 115 volt conductor 225.

The coil 284 of the trip relay 271 is operable by 6 volt current from a winding 285 of the transformer 273, this winding being connected from one end to chassis ground 267 and also serving to furnish heater current for the tubes 269 and 270 as well as current for other apparatus hereinafter described. A plurality of small conducting spring leaves 286, mounted on fingers 286a, Fig. 2, spaced along a transverse metallic rod 287, are rockable to make contact with a bus-bar 288, electrically connected to the coil 284. The rod 287 is grounded to the chassis 268, so that contact of any leaf 286 with the bus-bar 288 establishes the 6 volt connection through the coil 284 to trip the relay.

Actuation of the relay 271 closes contactors 280, 289 and 290. Contactor 280, through the previously described connections, directs 115 volt current through the magnetic counter 282, thus causing the latter to register one unit. Contactors 289 and 290 respectively connect the cathodes 291 and 292 of tubes 269 and 270 to chassis ground 267 and hence to the D. C. output 278.

The plate lead 293 of the tube 269 is connected through a resistor 294 and a conductor 295 to the magnetic clutch 131. From the clutch a return connection is made via a wire 296 and a branch 297 to a normally closed contactor 298 of the relay 260, thence via a wire 299 to the second output conductor 300 of the rectifier 272. From the above described connections it will be evident that when the tube 269 is energized and so long as the contactor 298 of relay 260 is closed, plate current from the tube 269 passes through the magnetic clutch 131 to hold the latter engaged.

Similarly, the plate lead 301 of the tube 270 is connected via resistor 302 and a conductor 303 with the bus segment 254 of the rotary switch 249. When the latter is in either number two or number one position as shown, the above connection is continued through a wire 304 to one terminal of the coil 305 of the light control relay 221. The other terminal of the coil 305 is connected to the branch 297 and the normally closed contactor 298, thence via the wire 299 to the second output conductor 300 of the rectifier tube 272 as previously described. Thus, with the switch 249 in either number one or number two position and the relay contactor 298 closed, energization of the tube 270 causes its plate current to flow through the relay coil 305, closing the relay 221 to energize the lamps 137 via the connection previously described.

The coil 306 of the relay 260 is connected on one side via a wire 307 to one normally closed pole 308 of a double-pole switch 309 located on the control panel 94, thence via a conductor 310 to the 6 volt current winding of the transformer 273. The other side of the coil 306 is connected to one side of a normally open contactor 311, on the relay 260, and also through a branch 312 to the insulated spindles 121 and 122 holding the arms 119 and 120 which carry the pressure rollers 115 and 116, Fig. 2.

Figure 9:
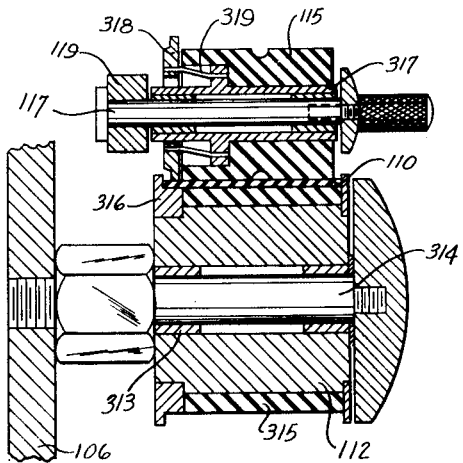
Fig. 9 is a detail longitudinal section of one set of the film safety wrap control contacts.

Referring to the detail sectional view, Fig. 9, it will be noted that the tension roller 112 has internal metallic bushings 313 rotating on a pin 314 secured in the camera plate 106. The main outer portion 315 of the roller 112 is made of resilient material such as rubber, but a stepped metallic collar 316, disposed on the metallic inner end of the roller, forms a guiding surface for the inner marginal portion and edge of the film 110.

The pressure roller 115, composed preferably of a hard plastic, non-conducting material, has a metallic core 317 rotatably mounted on the pin 117. A narrow annular contact ring 318 is disposed at the inner end of the roller 115, being attached to the metallic core 317 by short longitudinal wire springs 319 so as to be rotatable with the roller but radially displaceable. The ring is of slightly greater diameter than the roller. The preferred type of film 110, Fig. 9a, has two marginal notches 320 and 321, situated on opposite sides of the strip and dividing the latter longitudinally into three portions. The first portion A, including the leading end of the film and hereinafter referred to as the leading safety wrap, is of sufficient length that when rolled it forms a number of outer layers about the main working portion B to protect the latter from light and to provide a margin for threading.

The middle portion B, as noted, comprises the principal length or working portion of the film, while the trailing end portion C forms a terminal safety wrap to protect the exposed film during daylight unloading.

Figure 10:
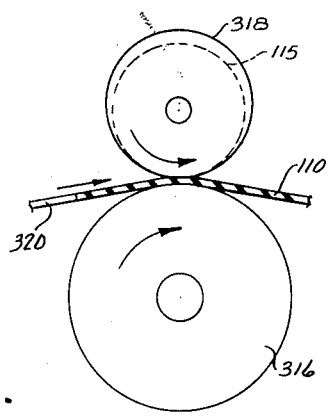
Fig. 10 is a diagrammatic end view of the above contacts showing the contact-making ring in running position.
Figure 11:
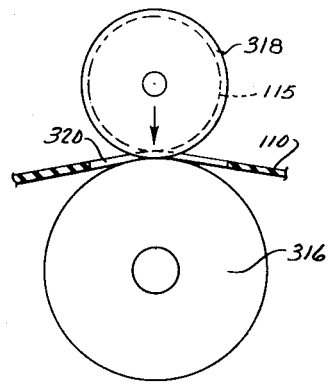
Fig. 11 is a similar view taken in stop position.

When an un-notched portion of the film, for example the leading wrap A, is between the rollers 112 and 115, the film prevents engagement between the contact ring 318 and the collar 316, the ring being displaced from concentricity with the roller 115 as shown in Figs. 9 and 10. However, when the notch 320 moves between the collar 316 and the ring 318, as shown in Fig. 11, the springs 319 force the ring 318 into engagement with the collar 316, which latter is grounded to the camera plate 106 via the pin 314.

The drive roller 113 and its pressure roller 116 are similarly fitted with guide collar 322 and contact ring 323 respectively, Fig. 14, these parts being identical in structure and operation with those described except that they are disposed on the outer ends of the rollers and hence adapted to be brought into contact through the second film notch 321.

The camera plate 106 is joined via a wire 324 with ground 325 on the chassis of relay 260 and thence via a wire 326 with ground 267 on the electronic control chassis 268. Thus whenever either film notch 320 or 321 appears between the roller contacts, the effect is to ground the second mentioned side of the relay coil 306, whereby the 6 volt connection is established through the coil to throw the relay 260.

The camera head motor 130, Figs. 5 and 14, is a two-speed synchronous type having one lead 327 permanently connected to the 115 volt conductor 225. A pair of slow-speed leads 328 and 329, running to the rotary switch 249, are connectable thereby in number one switch position with bus segments 250 and 251 respectively, thence by previously described connections through the normally closed contactor 259 of the relay 260 to the second main power conductor 127. High-speed leads 330 and 331 of the camera head motor 130 are similarly connectable to the conductor 127 via the switch 249 in number two and three positions thereof.

The conveyor motor 43, Figs. 3 and 14, is of the reversible synchronous type having four leads 332, 333, 334 and 335 running to a reversing switch 336 on the panel-board 94. One current supply connection to the switch 336 is from the 115 volt conductor 225 via the previously described wire 283. The second supply connection to the switch 336 is through a branch 337 of the conductor 263 which, as noted, receives its current from the second power conductor 187 via the normally closed contactor 259.

From the foregoing connections it is evident that actuation of the relay 260 and thereby opening the contactor 259 cuts off the current supply of both the camera head motor 130 and the conveyor motor 43. At the same time, opening the relay contactor 298 cuts off the direct current supply conductor 300 via conductor 299 both from the clutch 131 and the light control relay coil 305. The latter being de-energized, permits the contacts 220 and 222 to disengage, thus also denying current to the lamps 137. The third or normally open contactor 311 of the relay 260, when closed, establishes a second ground connection for coil 306, thus setting up a holding circuit to keep the relay energized independently of the described roller contacts which initiated the actuation.

The relay 260 having been locked in as noted, it may be unlocked manually by opening the normally closed pole 308 of the double-pole switch 309, hereinafter referred to as the re-set switch, thereby breaking the supply of 6 volt current to the coil 306.

The re-set switch 309 has a second or normally open pole 338 adapted, when closed, to establish a connection between the previously described electronic control chassis ground wire 266 and a branch 339 of a conductor 340 electrically connected to the cathode 291 of the tube 269, bypassing the trip relay contactor 289. Thus operation of the re-set switch 309 resets the motor control relay 260 and at the same time causes the tube 269 to be energized independently of the trip relay 271, thereby also energizing the clutch 131.

The rotary switch 249 in number three position is also adapted to connect conductors 266 and 340 via bus segment 253, thus keeping the tube 269 and clutch 131 energized while printing, as hereinafter described.

A pilot or "end-of-film" signal lamp 341, located on the panel 94, is connected between 6 volt conductor 310 and the conductor 312 leading to the pressure roller arm spindles 121 and 122. The lamp 341 is thus normally connected in parallel with the motor control relay coil 306 and consequently is illuminated whenever the relay is energized.

A second pilot light 342 is connected on one side to the 115 volt conductor and on the other side via a lead 343 and a variable resistor 344 to the second power conductor 187. This lamp serves as a readily visible indicator when closure of the main switch 188 connects the power supply.

The operation of the device is as follows:

*Photography*

Figures 9A, 12:
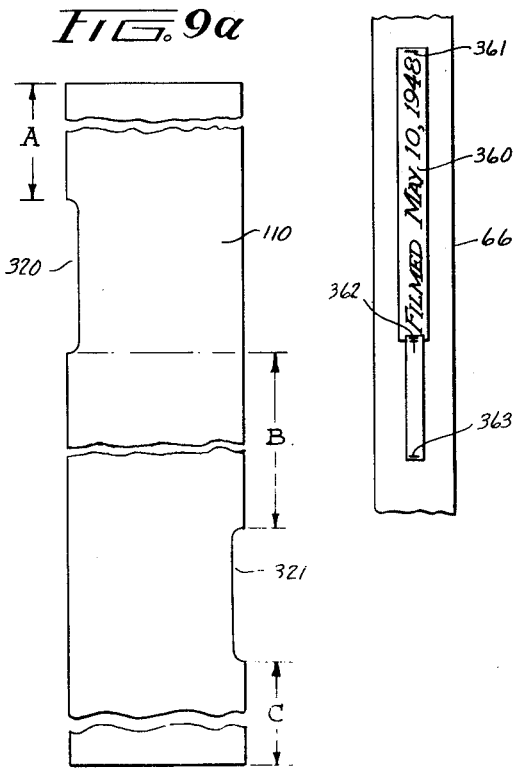

In order to load the camera head with film, the door 32 is opened as illustrated in Fig. 5, thus swinging the camera head out to readily accessible position. The rollers 115, 116 and 163 are retracted, a roll of film 110 is placed on the supply reel 111 and the leading end of the film, that is the leading safety wrap A, Fig. 9a, is led across the guide 109 and threaded into the take-up reel 114. The rollers 115, 116 and 163 are swung into engagement with the film 10 and the door 32 is closed, placing the camera head in operative position as shown in Fig. 2.

After closing the power switch 188 to energize the system, and sufficient time having elapsed to allow the tubes 269, 270 and 272 to heat up, the rotary switch 249 is swung to number three or "print" position. As the leading safety wrap A of the film 110 is between the collar 316 and contact ring 318 as shown in Figs. 9 and 10, and also between similar ring 322 and collar 323, the relay coil 306 is kept de-energized, allowing the camera head motor 130 to run at its high speed. At the same time, in position No. three, the switch 249 operates via its bus segment 253 and the previously described connections to connect the cathode 291 of the tube 269 to chassis ground 267, and D. C. output 278. The tube thus becomes charged, and its plate current actuates the clutch 131, causing the film 110 to be driven rapidly upward.

When the leading safety wrap A, Fig. 9a, has been unwound from the supply reel the film notch 320 permits the contact roller 318 to ground on the collar 316, energizing the relay 260 to break both the camera head motor and clutch supply circuits as hereinbefore set forth, thus stopping the film 110. As the lamp 341 is connected in parallel with the energized relay coil 306, the lamp lights to warn the operator that the safety wrap has been completely unwound.

The operator then throws the switch 249 to number two position, the normal photographing position, and throws the re-set switch 309, which is preferably a push-button type. The latter operation, by opening the switch pole 308, breaks the 6 volt supply to the relay coil 306, allowing the relay 260 to restore the camera head motor and clutch supply connections. While in position two the rotary switch 249 has broken the previously described ground 267 connection of the cathode 291 of tube 269, but closure of pole 338 of the re-set switch 309 restores this connection, causing the clutch 131 to engage. As the film moves forward the notch 320 is drawn out of registry with the collar 316 and ring 318, the film 110 thereupon separating these members to break their grounding connection. This action extinguishes the warning lamp 341, informing the operator that the film is in position to begin photography. The operator thereupon releases the re-set switch 309 and throws the conveyor motor switch 336 to forward position, starting the motor 43 which drives the drum 47 and its previously described system of conveyor tapes and rollers.

When ready for normal photography in accordance with the above procedure, the camera head motor 130 is running, the clutch 131 is released, the conveyor is running, and the lamps 137 are not illuminated.

When a piece of copy, such as a document or drawing 150, is to be photographed, it is placed on the table 54 face downward, and pushed into the throat 57, where it is grasped between the tapes 60 and 66 and is conveyed rearwardly. As the leading edge of the copy encounters the trip-fingers 286a it swings the latter upward, pressing the contact springs 286 against the bus-bar 288, thus establishing the 6 volt winding circuit for the trip relay 271 described in connection with Fig. 14.

Closure of the relay contactors 289 and 290 connects the cathodes 291 and 292 to ground, initiating energization of the tubes 269 and 270. Closure of the third contactor 280 energizes the counter 282, causing the latter to register one exposure. Energization of the tube 269 supplies plate current to the clutch 131, causing the latter to engage and drive the film 110. Also, the energizing of the tube 270 supplies plate current therefrom through the coil 305 of the light control relay 221, closing this relay and thereby turning on the lamps 137.

As the copy continues to be conveyed rearwardly its leading edge is moved over the shoe 83 and transparent plate 82 into gripped engagement between the tapes 66 and the third set of tapes 74. Since all tapes or belts are driven at the same speed from the drum 47 and by friction engagement with each other and with the copy, the latter is moved smoothly and evenly across the plate 82, thence upward around the rear of the drum 47 between the tapes 66 and 74. When the machine is set for top front delivery, as shown in full lines in Fig. 2, the copy 150 is directed forwardly and downwardly by the rubber flanges 81 on roller 77, the upper guide member 90, the tapes 66 and the rubber flanges 73 of the roller 69. The copy thus is deposited face upward in the delivery receptacle 88.

In its passage over the transparent plate 82 the downwardly directed face of the copy 150 is illuminated by the lamps 137. As the illuminated copy crosses the area D above the conduit 136, reflected light from the copy passes down through the conduit and via mirrors 147 and 148, lens 108 and slotted guide 109 to the film 110, where it is impressed as an image. As the copy is moving, its image on the film is one of flowing subject matter, the direction of flow of the image across the optical axis 149a being opposite to that of the copy material, due to the reversing effect of the lens 108.

Accordingly, the driving mechanism between the motor 130 and the film 110 is so constructed as to drive the film in the same direction as the flow of image thereon and at a speed slower than that of the copy in exact ratio to the photographic reduction employed. Thus the combination of the conveyor and its driving mechanism, the intermediate optical system and the camera head with its synchronised driving mechanism comprises a flow camera, in which the flow of the film is in cooperative registry with the flow of the image furnished by the conveyor motion, resulting in a continuously accurate photographic record throughout the length of the copy being fed.

When the trailing end of the copy 150 clears the fingers 286a the latter swing downward, disengaging the spring contacts 286 from the bus-bar 288, allowing the relay 271 to open the cathode circuits and also the supply circuit of the counter 282. As the tubes 269 and 270 are de-energized the fall of their plate currents respectively allow the clutch 131 to disengage and the light control relay 221 to open, thus stopping the film 110 and extinguishing the lamps 137.

At normal speeds of operation an appreciable time interval occurs between the closing operation of the trip fingers 286a by the leading edge of the copy 150 and the arrival of the latter at the photographing area D. To avoid waste of film and to allow proper regulation of the frame spacing thereon, a time delay is introduced between the actuation of the fingers 286a and the operation of the clutch and lamps. Similarly a delay of slightly longer duration is necessary after release of the fingers in order to allow the trailing end of the copy to be completely photographed. In our previously mentioned application Serial No. 622,198, now Patent No. 2,509,072, a delay was provided by introduction of a condenser and resistor combination in the grid circuits of the electronic control tubes. In the present invention improved performance and differential adjustment of the circuit closing and opening delays are secured by introduction of time delay means both in the grid and plate circuits as follows, referring to Fig. 14:

A condenser 345 is connected between the cathode 291 of tube 269 and the movable electrode 346 of a variable resistor 347, the total resistance of the latter being connected between ground 267 and the grid 348. A fixed resistor 349 is shunted from the movable electrode 346 to ground. A second condenser 350 of much larger capacity than that of condenser 345 is connected across the plate circuit via an adjustable tap 351 on the resistor 294. The tube 270 is provided with a similar cathode-grid time delay network 352 and a plate circuit condenser 353 connected via an adjustable tap 354 to the resistor 302.

Taking the operation with respect to the tube 269 as typical of both systems, while the cathode 291 is disconnected from ground the condenser 345 is held below ground potential by flow of grid current through the grid 348 and the described resistor combination. When the cathode 291 is connected to ground the condenser charges up toward ground potential, thus raising the grid potential until current flows across the tube after the time delay required to charge the condenser through the connected resistance. As the plate current flows it first charges the second condenser 350 with a short additional time delay, then energizes the clutch 131 as previously set forth.

When the trip relay 271 opens, thus breaking the ground connection to the cathode 291, the condenser 345 discharges, its potential and that of the grid 348 again falling below ground potential. Meanwhile the power supply across the tube having been cut off, current through the load is maintained for an interval of time by discharge of the second condenser 294 through the load, including the clutch 131 and the lower portion of the resistor 302 in series therewith. By this means disengagement of the clutch is delayed by an interval which is adjustable by the movable tap 354.

From the foregoing it will be evident that both the condenser 345 and the condenser 350 contribute to the circuit closing time delay, while the circuit opening time delay is produced almost entirely by the second condenser 350 alone. Furthermore the discharge time of condenser 350 is considerably greater than its charging time, due to the slow leakage of its comparatively large charge through the load as noted. These relationships permit ready adjustment of the closing and opening delay periods to different values as required, the preferred practive being to first set the opening delay period by adjusting the tap 351, then set the total closing delay by adjusting the movable contact 346.

In a similar manner to that described, the network 352 and second condenser 353 associated with the tube 270 provide adjustable time delay intervals in the energizing and de-energizing of the light control relay 221, which can be set to maintain any desired timing relation with the described control of the clutch.

Maintenance of the determined time delays at constant values even under various conditions of line voltage is made possible by the fact that the electronic system current supply line 275 is connected to the constant 115 volt conductor 225 instead of directly to the power supply conductor 186.

Operation of the clutch 131 directly by the plate current of the tube 269, instead of through a relay, has various advantages in addition to the elimination of the relay. By employing full-wave rectified current instead of AC in the clutch winding, tendency to hum and vibration is substantially eliminated. Furthermore, the comparatively gradual build-up and fall-off of the rectified current supply, due to the time delay action described, tends to soften or cushion engagement and disengagement of the clutch, thus preventing sudden jerks and possible irregular operation of the film 110. Both these effects are obviously of great importance in micro-film work, wherein uniform smoothness of film control and absence of vibration are essential to highest precision work.

As a number of documents, drawings or the like are fed through the machine they successively trip the fingers 286a and are photographed on the film, and are thereafter deposited face up in the delivery receptacle 88 as previously noted. By the location of the latter at convenient eye-level above the feed table 54 and immediately below the control panel 94, all the normal operations of feeding, controlling the machine, and taking out the photographed copy are readily accomplished by a single operator comfortably stationed in front of the machine, without stooping or moving about so as to slow down the operations.

An example of the gain in efficiency provided by the top delivery as described is in the elimination of re-checking stacks of photographed copy for feeding errors. With prior devices wherein successively photographed documents are stacked in a delivery receptacle near the bottom of the machine or other location not immediately accessible to the operator's view, an improperly fed document may either go undetected or can be detected only by subsequent rechecking of the entire delivered stack. On the other hand, with the present invention, a document wrongly fed, so that only its blank back is photographed, appears immediately thereafter directly in the operator's view and wrong side up, so that the error can be detected at once and corrected by re-feeding the document in proper position.

In some types of service it is desirable to deliver photographed copy from the upper rear of the machine, for example when a very large number of documents must be photographed in minimum time, warranting the use of two operators, or in the case of very wide and long copy such as large drawings or blueprints which themselves cannot readily be handled by one person. To provide for rear delivery the small levers 104, Fig. 2, may be lowered by means of latching handles 355 on the ends of their rod 356, the handles 355 being located in the hollow frames 15 and 16 as illustrated in Fig. 4. Lowering the levers 104 permits the deflector 103 to swing down to the position shown in dot-and-dash lines in Fig. 2, the fingers 105 resting between the tapes or belts 66 and extending into the grooves 71 in the drum 47.

With the above-described arrangement, when copy emerges from between the tapes 66 and 74 above the drum 47, it is intercepted by the deflector 103 which guides it upwardly and rearwardly around the roller 77, the latter and the inclined tapes 74 thereafter cooperating to eject the copy through a rear delivery opening 357. Receiver baskets of any suitable type such as 358 may be suspended from the transverse member 23, though for very long drawings, as previously mentioned, the baskets may be omitted and the copy ejected directly to tables or reeling devices. Letters and the like picked successively from a face-up stack and fed face-down, are rear-delivered in proper serial order, eliminating re-stacking for return to files.

During operation of the machine, when the working portion B of the film (Fig. 9a) is exhausted the second notch 321 allows the ring 322, Fig. 14, to engage the grounded collar 323. The relay 206 is thereby energized in the same manner as previously described, stopping both motors 130 and 43, releasing the clutch 131, turning off the lamps 137, and lighting the alarm or "end-of-film" lamp 341. The operator then throws the re-set switch 399, de-energizing the relay 260 to re-start the motors and throw in the clutch 131, also as previously explained. The trailing safety wrap C having been wound up about the exposed film on reel 114, Fig. 2, the contact ring 322 again grounds on the collar 323 to stop the machine. Thereupon the operator opens the door 32 to swing the camera head outward, removes the exposed film protected by its safety wrap C, threads in a new roll of film, closes the door 32, and resumes operation as before.

When photographing wide and long copy such as those previously mentioned, the copy sheet may occasionally be accidentally introduced at sufficient angle that, if allowed to continue to feed, the edge of the copy may work over the side of the conveying mechanism with consequent crumpling or tearing. When this danger is detected by observation of the copy entering the throat 87, the conveyor motor 43 may be reversed by means of the switch 336, backing the copy outward to permit its being re-entered properly.

It is obvious that while the device is especially adapted to the photographing of drawings and the like of comparatively large width, and any length, its use is not limited thereto. In order to allow the filming of materials of different width categories to the best advantage, a number of interchangeable lenses 109 may be provided having different reduction ratios, corresponding speed ratios being obtainable by interchangeable sizes of film drive rollers 113.

To maintain proper exposure density at different film speeds, the intensity of illumination on the copy is adjusted by means of the rotary switch 207. It will be noted in Fig. 3 that the spacing of the lamps 137 tapers from widest spacing in the middle of the rows to narrow spacing near the ends, thus providing uniform combined light intensity throughout the entire width of the field.

For use with certain slow emulsion films and for various other purposes which will be evident to those skilled in the art, provision is made for photographing at slower speed. To accomplish this, the conveyor drive belt 52 is shifted to low speed drive position on the pulleys 46 and 51. The photographing operation is carried out in the same manner as described above, except that the rotary switch 249 is turned to number one position, thus energizing the camera head motor 130 through its low-speed leads 328 and 329.

Each actuation of the electronic control by the leading edge of a sheet of copy energizes the magnetic counter 282 as described, thus keeping a visual record of the number of exposures. A finger wheel 282a, Fig. 1, is provided for re-setting the counter.

When filming comparatively narrow sheets such as letters and the like, guide bars 359, Fig. 2, may be attached to the feed table 54 to confine the copy to the proper zone for uniform lateral location on the film.

In various types of service it is desirable to edge-mark the film with identifying data such as date of filming or the like. For this purpose strips 360 of paper or other suitable sheet material bearing the desired indicia may be attached to one of the tapes 66, a tape being selected which is beyond but immediately adjacent to one edge of the copy 150 being photographed, as illustrated in Fig. 3. Fig. 12 shows in detail a preferred method of attaching the marking means. The leading end of the marked strip 360 is removably stapled or clipped directly to the tape 66 at 361. A short elastic ribbon 362 is secured to the other end of the strip 360. The ribbon 362 is stretched slightly and its outer end stapled or clipped to the belt 66 at 363. Thus the ribbon 362 holds the marker strip 360 resiliently in tension, allowing the latter to conform to the tape 66 in its passage around the drum 47 and associated rollers and holding the strip flat as it passes through the photographing area D.

In operation, as the strip 360 passes through the area D an image of its indicia is impressed on the film 110 beside the image of the copy being photographed. The tape 66 may carry as many strips 360 as are required to produce the desired frequency of marking on the film.

*Flow printing or enlarging*

For making enlarged prints from micro-film, the drive belt 52 is placed in low-speed driving position as in low-speed photography, and the lamp banks 139 and 140 are unplugged at 145, Fig. 3. The bracket 178, with the arc-lamp 180 and condensing lens 181 is installed in the camera head as shown in Fig. 8, the plug 182 is placed in the socket 184, the reel of film 364 to be reproduced is placed on the feed spindle 111 and threaded to the take-up spindle 114 in the usual way, after which the camera head is swung into operating position by closing the door 32. The film is then run forward to pass the threading allowance or safety wrap in the same way as previously described.

The room is either darkened or illuminated with light of a color to which the printing stock is insensitive, and the switch 227 is closed to start the arc 248, Fig. 14, and thereby illuminate the film behind the guide slit 164. The rotary switch 249 is turned to number one position, and the leading edge of a suitable length of sensitized sheet is fed sensitive-side downward, into the throat 87, where it is gripped between the tape systems 60 and 66 and conveyed through the machine in the same manner as described for copy being photographed.

As the leading edge of the sheet passes inward it trips the fingers 286a, Fig. 2, causing the clutch 131 to engage and drive the film after a suitable time interval as set forth previously. Thereafter a continuously flowing image of the film moving across the slit 164 is projected via the mirrors 146 and 147, through the transparent plate 92 to the sensitized sheet passing across the area D, the speed of the sheet matching the flow-speed of the image so that a continuous reproduction of the film is produced. The intensity of the light is regulated by means of the rheostat 241.

As in the case of photography, the exposed sheet is delivered from the top of the device, either at the front or rear as desired.

Contact printing

When it is desired to make direct positive film prints from negative film, the camera head is swung outward by opening the door 32, and the film guide 109 carrying the lens 108 is replaced by the guide 172, Fig. 7, carrying the frame 173 and lamps 175, the prong 176 engaging the jack 171.

The negative film 364 is threaded from the supply reel 111 to the take-up reel 114. A pair of auxiliary supply and take-up spindles 365 and 366, Fig. 7a, are adapted to receive reels 367 and 368 which carry an unexposed film 369, which latter is passed between the pressure and tension rollers 115 and 112 across the guide 172 and between the pressure and drive rollers 116 and 113 in contact with the negative film 364, preferably emulsion side to emulsion side. The auxiliary guide roller 163 may also be swung into place to press the films together.

The door 32 is closed, swinging the camera head into operating position, and the rotary switch 249 is turned to number three position. This operation acts through connections previously described and shown in Fig. 14 to start the camera head motor 130 at high speed, energize the tube 269 to throw in the clutch 131, and light the printing lamps 175. The two films 364 and 369 are drawn together at constant speed across the slit 164a in the guide 172, the light from lamps 175, diffused by the screen 177, effecting continuous printing on the undeveloped film 369.

The density of printing may be regulated by means of the rheostat 265. When the operation is completed and the films run from between the rollers 115 and 112, the latters' ring 323 and collar 322 make contact in the manner previously set forth, tripping the relay 260 to throw out the clutch 131, stop the motor 130 and light the signal lamp 341.

The camera head is then swung outward, and the exposed film 369, protected by its trailing safety wrap, is removed for development.

The compartment 30 provides a convenient storage space for extra film rolls, alternative lenses, etc., rendering the device a completely self-contained unit requiring no outside storage for accessories.

From the foregoing description it is believed evident that the elements and combinations comprising the invention have produced a machine combining simplicity and extreme compactness with a high degree of versatility, and ease of operation. The latter is illustrated by the desk-level feed and top-delivery, with all normal operating controls immediately above the front delivery receiver in easy reach and sight of the operator, and by the swing-out of the complete camera head for easy changing of film, substitution of lenses, and the like.

The improved optical system, wherein an extreme length of throw and consequent width of field are secured in small space with a minimum number of mirrors, the utilization of the mirror box 34 as one of the main structural members connecting the side frames 15 and 16, and the disposal of major units such as the conveyor motor 43 and the auto-transformer 192 in spaces provided by the narrowing of the light cone, contribute to the compactness noted.

The securing of all major stationary units either directly to the hollow side frames 15 and 16 or to stiff sheet metal structural members connecting these frames, gives extreme rigidity to the structure, while the anti-friction mounting of the conveyor drum 47 and all related rollers in the rigidly connected side frames provides permanently accurate alignment and smooth runing of the conveyor. The use of separate synchronous motors for conveyor and film drive, while maintaining accurate speed relationships between the film and copy, eliminates mechanical inter-drives and consequent gear or other transmission vibrations which are well known to be fatal to accurate micro-filming.

The smoothness and uniformity of drives secured by the means described, together with the permanent rigidity of alignment, the prefocussed lens mounting, the vibration-free mirror mounting, the improved lighting means, and the improved electronic control, enable the device to produce micro-films and full-size reproductions of copy of sizes up to and including large drawings, maps, newspapers, and the like, with a high degree of accuracy and at high speed.

The foregoing described operational procedures have been set forth in specific detail, but it will be understood that under special circumstances advantageous variations in these procedures may be made. For example, when the machine is to be used for photography and porjection printing only, with frequent alternations between the two services, the auxiliary guide or pressure roller 163 may be omitted and the arc-lamp 180 and condensing lens 181 kept in place as a permanent part of the assembly.

While the invention has been described in preferred form, it is not limited to the precise embodiment illustrated, as various changes and modifications may be made without departing from the scope of the appended claims.

What is claimed is:

1. In a micro-photographing device, in combination, a pair of upright end frames, a plurality of rigid transverse structural members extending between and secured to said frames to form therewith a wide rigid body, a feed table in the front of said body, a transverse guide member above said table and forming with the rear portion thereof a throat adapted to guide introduced sheet material into said body, means forming a front delivery opening above said guide member, conveyor means supported by said end frames near the top thereof and adapted to receive said sheet material introduced through said throat and to move said sheet material rearwardly between said frames, upwardly, and forwardly out through said front delivery opening, means to drive said conveyor means at a pre-determined speed, means within the front of said body to move a film vertically in predetermined speed relation to the speed of said moving sheet material, means to establish a focussed optical path between said film and a transverse zone on the bottom of said inwardly moving sheet material, and means to illuminate said zone, said feed table and said conveying means totally overlying said film guide, said film moving means, said optical path establishing means, and said illuminating means, said conveying means including means moving with said sheet material to grip both sides of said sheet material throughout said entire upward movement thereof.

2. A device as claimed in claim 1 wherein said illuminating means includes a first light source adjacent said zone and adapted to illuminate the same directly and a second light source operable alternatively with said first source to project light through said moving film and said optical path to said zone.

3. A device as claimed in claim 1 wherein said illuminating means includes a concentrated light source mounted in said body in optical line with said film and said optical path and on the opposite side of said film with respect to said path, said source being adapted to illuminate said moving film whereby an illuminated image thereof may be projected throughout said optical path to said moving sheet material.

4. A device as claimed in claim 1 including a control panel above said delivery opening, and manual means on said panel to control said conveyor driving means, said film driving means, and said illuminating means.

5. A device as claimed in claim 1 including means forming a second delivery opening in the rear of said body above the level of said feed table, and means above said conveyor means and adjustable to divert said material from said front delivery opening to said rear delivery opening.

6. In a device of the character described, in combination, a pair of upright end frames, a plurality of rigid transverse structural members extending between and secured to said frames to form therewith a wide rigid body, a feed table in the front of said body, a transverse guide member above said table and forming with the rear portion thereof a throat adapted to guide introduced sheet material into said body, means forming a front delivery opening above said guide member, conveyor means supported by said end frames near the top thereof and adapted to receive said sheet material introduced through said throat and to move said sheet material rearwardly between said frames, upwardly, and forwardly out through said front delivery opening, means to drive said conveyor means at a predetermined speed, means within the front of said body to move a film vertically in predetermined speed relation to the speed of said moving sheet material, means to establish a focussed optical path between said film and a transverse zone on the bottom of said inwardly moving sheet material, means to illuminate said zone, at least one of said end frames being hollow, and a movable closure on the outer side of said frame, said driving means for said conveyor means including a motor attached to the inner side of said hollow end frame and changeable ratio power transmitting means operatively connecting said motor to said conveyor means, said power transmitting means being housed within said hollow frame, whereby access to said power transmitting means for changing the speed ratio thereof is permitted by opening said movable closure.

7. In a device of the character described, in combination, a pair of upright end frames, a plurality of rigid tranverse structural members extending between and secured to said frames to form therewith a wide rigid body, a feed table in the front of said body, a transverse guide member above said table and forming with the rear portion thereof a throat adapted to guide introduced sheet material into said body, means forming a front delivery opening above said guide member, conveyor means supported by said end frames near the top thereof and adapted to receive said sheet material introduced through said throat and to move said sheet material rearwardly between said frames, upwardly, and forwardly out through said front delivery opening, means to drive said conveyor means at a predetermined speed, means within the front of said body to move a film vertically in predetermined speed relation to the speed of said moving sheet material, means to establish a focussed optical path between said film and a transverse zone on the bottom of said inwardly moving sheet material, means to illuminate said zone, one of said transverse structural members comprising a box-shaped member having an upper transverse slot and a front transverse slot and interior mirrors in cooperative optical alignment with said slots, said slots and mirrors comprising parts of said means for establishing said focussed optical path, and a light conduit between the top of said box-shaped member and said conveyor means in optical line with said upper slot, said conduit being adapted to limit the terminal projection of said optical path on said moving sheet and conveyor means to said narrow zone spanning substantially the transverse extent of said conveyor means, said light-furnishing means comprising light sources disposed forwardly and rearwardly of said conduit and adapted to illuminate said zone.

8. In a device of the character described, in combination, a pair of upright end frames, a plurality of rigid tranverse structural members extending between and secured to said frames to form therewith a wide rigid body, a feed table in the front of said body, a transverse guide member above said table and forming with the rear portion thereof a throat adapted to guide introduced sheet material into said body, means forming a front delivery opening above said guide member, conveyor means supported by said end frames near the top thereof and adapted to receive said sheet material introduced through said throat and to move said sheet material rearwardly between said frames, upwardly, and forwardly out through said front delivery opening, means to drive said conveyor means at a predetermined speed, means within the front of said body to move a film vertically in predetermined speed relation to the speed of said moving sheet material, means to establish a focussed optical path between said film and a transverse zone on the bottom of said inwardly moving sheet material, means to illuminate said zone, one of said end frames having an opening therein, transverse racks normally disposed in said body below said conveyor means adjacent said zone, said illuminating means comprising banks of lamps secured in said racks and adapted to illuminate said moving sheet material in said zone, said racks and lamp banks being slidable bodily outward through said opening in said end frame, means to establish an electrical circuit through each of said lamp banks from a source of current, and means disposed partly on said racks and partly on one of said end frames to break said circuits by removal of said racks through said opening.

9. In a device of the character described, in combination, a pair of upright hollow end frames, transverse structural members extending between said frames and secured thereto to form a rigid body of wide transverse extent relative to the horizontal depth thereof, means forming a feeding throat in the upper front portion of said body, a transverse roller journalled in said end frames and disposed adjacent the lower inner edge of said throat, a second transverse roller disposed rearwardly of said first roller and journalled in said end frames, a plurality of laterally spaced belts on said rollers and defining a conveyor plane in alignment with said throat, means to maintain said belts in tension, a third transverse roller above said first roller and swing mounted in said end frames, a transverse shaft journalled in said end frames rearwardly of and above the level of said second roller, a drum on said second shaft, a second plurality of laterally spaced belts on said third roller and said drum, said second belts normally engaging said first belts along said plane, a fourth transverse roller journalled in said frame in front of said drum and engaging the inside surfaces of said second belts, fifth, sixth and seventh transverse rollers disposed respectively below, rearwardly of, and above said drum, a third plurality of transversely spaced belts on said fifth, sixth and seventh rollers, tension means to press said third belts against said second belts throughout substantially the rear semi-circumference of said drum, means forming a front discharge opening above said feeding throat and in alignment with said fourth roller, said drum, rollers and belts being cooperative to convey sheet material from said feeding throat rearwardly along said plane, upwardly around the rear of said drum, and forwardly through said front delivery opening; a lens and means to move a film in said body below said plane and in cooperative optical alignment with a transverse zone of said moving sheet material between said second roller and the bottom of said drum, means to illuminate said zone, and means synchronized with said film-moving means to drive said drum.

10. A device as claimed in claim 9 wherein the lateral extent of said belt assemblies on said drum and said rollers comprises substantially the transverse distance between said hollow end frames, and wherein said drum driving means includes a motor mounted on the inner side of one of said frames and speed-changing means connecting said motor and said shaft within said frame.

11. A device as claimed in claim 9 including a rigid transparent plate underlying said transverse zone.

12. A device as claimed in claim 9 wherein said drum has circumferential grooves therein between said spaced second belts, including means forming a second delivery opening in the rear of said body, a curved deflector above said drum, terminal fingers on said deflector, said deflector including said fingers being normally positioned to clear said moving sheet material, and means to adjust said deflector downward to bring said fingers within said grooves, whereby said deflector may divert said sheet material from said front delivery opening to said rear delivery opening.

13. In a flow camera, in combination, a casing, a camera head having a photographic field within said casing and including means to move a sensitized film, means to move a sheet of copy through said field in predetermined speed relation to the movement of said film, means operable by said moving means to present indicia adjacent said copy and moving through said field at the same speed as said copy, and means to illuminate said moving copy and indicia in said field, whereby adjacent images of said copy and said indicia may be impressed on said moving film, said copy-moving means including a plurality of laterally spaced conveying belts adapted to engage said copy, said indicia-presenting means including an additional belt parallel to said conveying belts and adjacent the path of said copy through said field.

14. In a flow camera, in combination, a casing, a camera head having a photographic field within said casing and including means to move a sensitized film, means to move a sheet of copy through said field in predetermined speed relation to the movement of said film, means operable by said moving means to present indicia adjacent said copy and moving through said field at the same speed as said copy, and means to illuminate said moving copy and indicia in said field, whereby adjacent images of said copy and said indicia may be impressed on said moving film, said copy-moving means including a plurality of laterally spaced conveying belts adapted to engage said copy, said indicia-presenting means including an additional belt parallel to said conveying belts adjacent the path of said copy through said field, and a ribbon carrying said indicia and detachably secured to said additional belt.

15. In a device of the character described, in combination, a casing including a frame having an opening therein, a camera head having a photographic field within said casing and including means to move a sensitized film in a path remote from said field, means to move a sheet of copy through said field, a rack in said casing adjacent said field, a bank of lamps secured in said rack and adapted to illuminate said copy in said field, said rack and lamp bank being slidable bodily outward through said opening in said frame, means to establish an electrical circuit through said lamp bank from a source of current, and means disposed partly on said rack and partly on one of said end frames to break said circuit, by removal of said rack through said opening.

VERNEUR E. PRATT.
GEORGE F. GRAY.

REFERENCES CITED

The following references are of record in the file of this patent:

UNITED STATES PATENTS

| Number | Name | Date |
| --- | --- | --- |
| 1,344,896 | Jobke | June 29, 1920 |
| 1,536,555 | Ayres | May 5, 1925 |
| 1,695,415 | De Forest | Dec. 18, 1928 |
| 1,764,938 | De Forest | June 17, 1930 |
| 1,783,045 | Kellog | Nov. 25, 1930 |
| 1,808,113 | Peterson | June 2, 1931 |
| 1,836,607 | Malcolm | Dec. 15, 1931 |
| 1,900,878 | Hopkins | Mar. 7, 1933 |
| 1,987,064 | Hopkins | Jan. 8, 1935 |
| 2,177,135 | Fassel | Oct. 24, 1939 |
| 2,234,717 | Altman | Mar. 11, 1941 |
| 2,235,844 | Nelson | Mar. 25, 1941 |
| 2,292,825 | Dilks | Aug. 11, 1942 |
| 2,320,350 | Del Riccio | June 1, 1943 |
| 2,335,956 | Oiler | Dec. 7, 1943 |
| 2,375,213 | Chilton | May 8, 1945 |
| 2,401,203 | Trump | May 28, 1946 |
| 2,411,694 | Place | Nov. 26, 1946 |
| 2,419,836 | Holbrook | Apr. 29, 1947 |
| 2,432,704 | Worman | Dec. 16, 1947 |
| 2,439,055 | Pratt | Apr. 6, 1948 |
| 2,452,497 | Schutt | Oct. 26, 1948 |
| 2,492,127 | Hessert | Dec. 20, 1949 |